Figure 1:
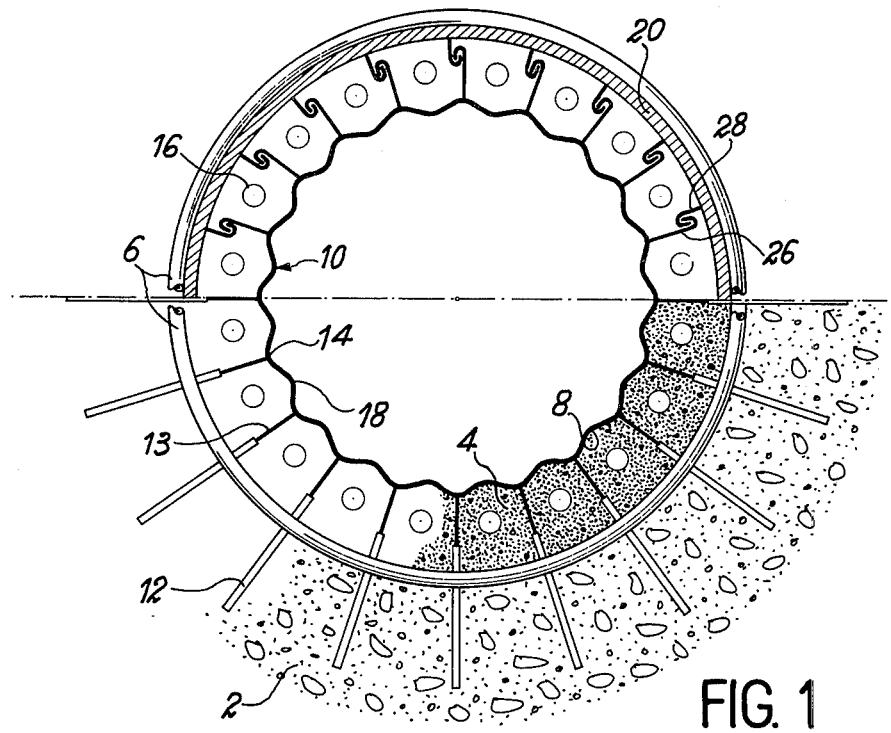

United States Patent [19]
Costes

[11] 3,933,182
[45] Jan. 20, 1976

[54] SYSTEM FOR SEALING AND HEAT-INSULATING A DUCT CONTAINING A HOT FLUID UNDER PRESSURE

[75] Inventor: Didier Costes, Paris, France

[73] Assignee: Commissariat a l'Energie Atomique, Paris, France

[22] Filed: Feb. 5, 1974

[21] Appl. No.: 440,136

[30] Foreign Application Priority Data
Feb. 6, 1973  France .............................. 73.04169

[52] U.S. Cl. ................ 138/149; 138/108; 138/113; 138/114; 138/121; 138/173; 138/175; 138/176; 52/249; 165/136; 165/169
[51] Int. Cl.............................................. F16l 5/02
[58] Field of Search .......... 138/108, 113, 114, 121, 138/149, 173, 175, 176; 165/169, 136; 52/249; 176/39, 50, 87

[56] References Cited
UNITED STATES PATENTS
2,330,966  10/1943  Gottwald et al. ................... 138/149
3,424,239  1/1969  Coudray ........................... 52/249 X FOREIGN PATENTS OR APPLICATIONS
2,068,978  9/1971  France Primary Examiner—John W. Huckert
Assistant Examiner—James E. Bryant, III
Attorney, Agent, or Firm—Cameron, Kerkam, Sutton, Stowell & Stowell

[57] ABSTRACT

A duct for the circulation of a hot fluid under pressure and formed in a cold structure of concrete is lined with rigid heat-insulating material such as pumice concrete. A corrugated lining membrane is applied in close contact with the heat-insulating material by means of radial members which are disposed in uniformly spaced relation and anchored in the cold structure.

7 Claims, 2 Drawing Figures

2

SYSTEM FOR SEALING AND HEAT-INSULATING A DUCT CONTAINING A HOT FLUID UNDER PRESSURE

This invention relates to a corrugated hot leak-tight lining membrane, especially for nuclear reactor ducts.

It is known that, in the majority of nuclear reactors which are cooled by circulation of a fluid under pressure and in particular in boiling-water reactors, the functions of mechanical resistance to pressure and of impermeability to the fluid of the reactor pressure vessel are performed by separate means, namely the following:

a pressure vessel constructed of prestressed concrete and designed to afford resistance to pressure, a steel lining membrane placed within the interior of said pressure vessel and designed to afford impermeability to the fluid.

It is also known that two types of steel lining membrane are at present in existence for the purpose of obtaining leak-tightness, namely the so-called "cold" membranes and the so-called "hot" membranes. In the first type, the lining membrane is directly applied against the concrete of the pressure vessel and a heat-insulation system which can assume a number of alternative forms is interposed between said leak-tight lining membrane and the hot primary fluid. In the second type, the leak-tight lining membrane is in contact with the hot fluid such as the primary fluid, for example, and heat-insulating material is interposed between said membrane and the pressure vessel.

The present invention relates to the second type of leak-tight lining membrane.

Among the hot lining membranes can be distinguished the "plain" membranes and the "corrugated" membranes.

The lining membranes of the first type are applied against the concrete of the pressure vessel by anchoring systems and if necessary by the pressure of the fluid within the interior of the reactor. Said first membranes are constrained to follow the pressure-dependent dimensional variations of the pressure vessel and the inherent temperature-dependent expansion of these membranes is thus prevented. In the cold state, the danger of excessive separation between the concrete and the leak-tight lining membrane makes it necessary to have a large number of anchoring elements of substantial size. Aside from the fact that they increase the cost as well as the complexity of construction of the installation, such anchoring elements increase the thermal conductivity of the reactor vessel structure as a whole.

An example of a leak-tight lining membrane of the second type mentioned in the foregoing, namely the corrugated hot membrane, is disclosed, in French Pat. No. 70 39621 of Sept. 3rd, 1971 in respect of "Internal metallic lining for prestressed concrete pressure vessel".

In this patent, leak-tightness is obtained by depositing on the wall of the concrete pressure vessel an internal heat insulation on which is anchored a metal cylinder, that face of the cylinder which is directed towards the interior of the duct being fitted with U-section members which are uniformly spaced around its periphery and so arranged as to project into the interior of the duct. The troughs or bases of the waves of a corrugated leak-tight lining membrane are applied against the rounded portions of said U-section members. The essential disadvantage of this system lies in the fact that it fails to solve the problems arising from deformation of the lining membrane. In point of fact, the first metal cylinder is subjected to high thermal stresses by reason of the fact that there is no thermal insulation between the cylinder and the hot fluid and this gives rise to the same anchoring difficulties as in the case of the plain membrane. Deformations of said metallic cylinder are liable to cause deformation of the U-section members which support the corrugated lining membrane and may therefore set up stresses within said membrane. Furthermore, since the membrane is not rigidly fixed to the U-section members, there is a danger that the wave bases of the corrugated lining membrane may not return to exactly the same position on the U-section members when the membrane expands.

The precise aim of the present invention is to provide a leak-tight lining membrane for nuclear reactors which overcomes the disadvantages mentioned in the foregoing.

The system for sealing and heat-insulating a duct containing a hot fluid under pressure limited by a cold structure essentially comprises:

an internal duct lining of rigid heat-insulating material, a cylindrical sheet-metal element of corrugated transverse section which completely covers said heat-insulating lining, said lining being provided with the same corrugations as said sheet-metal element and means for anchoring said sheet-metal element in the cold structure and disposed along radii of said duct, each of the means aforesaid being secured at one end thereof to a wave base of said sheet-metal element and at the other end thereof to said cold structure, said means being uniformly spaced over the entire length of said duct and so arranged as to pass through the heat-insulating lining.

In accordance with another characteristic feature, the cold structure is of concrete and the heat-insulating lining is of pumice concrete.

Figure 2:
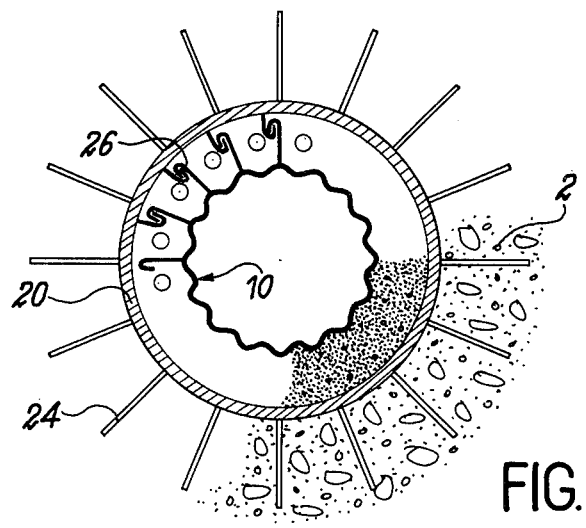

A better understanding of the invention will in any case be gained from the following specification in which a number of embodiments of the sealing system according to the invention are given by way of example, reference being made to the accompanying drawings, in which:

FIG. 1 is a sectional view taken along a plane at right angles to the axis of the duct and consisting of two half-views in which the bottom half-view represents the leak-tight lining membrane of a steam duct in that portion of the duct which passes through the cylindrical concrete shell of a nuclear reactor pressure vessel, and in which the top half-view represents the same lining membrane in the line of extension of said duct within the interior of a steel tube, FIG. 2 is a view taken along the same sectional plane and showing a water-inlet pipe.

The bottom half-view of FIG. 1 represents one example of application of the lining membrane in accordance with the invention. There is shown first the duct 2 proper which is constituted by the cold concrete structure and affords resistance to the pressure of the fluid which circulates within the duct. A heat-insulation lining 4 of pumice concrete, for example, is applied against the wall of said duct 2. A cooling coil 6 is interposed between the structure 2 and the heat-insulation lining 4. The corrugated lining membrane 10 is placed against the internal wall 8 of the heat-insulation lining 4. This leak-tight lining membrane is constituted by a corrugated sheet-metal element, for example of stainless steel having a thickness of 5 mm and so arranged as to cover the entire heat-insulation lining 4. The sheet-metal element is maintained against the heat-insulation lining 4 by means of anchoring rods such as the rod 12. One end of each rod is rigidly fixed to a continuous sheet-metal rib 13 which is welded to a wavetrough 14 of the corrugated membrane 10 whilst the other end of said rod is embedded in the structural concrete and thus constitutes an anchoring system. Drainage ducts such as the duct 16 which are parallel to the axis of the main circulation duct and serve to detect any possible leakage are embedded in the pumice concrete.

Owing to the fact that the corrugated membrane is anchored in the cold structure by means of the wavetroughs 14, the sheet metal expands towards the wave crests such as the crest 18 under the action of a temperature rise. The sheet metal thus moves away from the heat-insulation lining 4 to a slight extent. If the temperature begins to fall rapidly, the resultant shrinkage of the sheet metal element does not have the effect of subjecting the anchoring rods 12 to high values of stress by virtue of the high flexibility of said element. It is thus possible to employ anchoring rods of relatively small diameter.

By way of example in the case of a duct having an external diameter of 900 mm, the corrugated sheet metal element which constitutes the lining membrane is of stainless steel and has a thickness of 5 mm. The internal diameter of the lining membrane is 615 mm and its external diameter is 650 mm. The continuous anchoring ribs have a thickness of 2 mm and a height of 80 mm. The anchoring rods employed have a diameter of 10 mm and are set in the concrete to a depth of 200 mm. Two consecutive anchoring rods are inclined to each other at an angle of 18°. Anchoring is thus provided in the radial direction at intervals of 12 cm whereas anchoring intervals of 30 cm can be considered sufficient in the longitudinal direction.

The top half-view shows the same duct at the point at which it is provided with a supporting tube for a valve placed within the interior of said duct. In this case, anchoring is obtained by means of two sets of ribs in cooperating relation. One set consists of ribs such as 26 which are welded externally to the lining membrane at the wave-troughs. The other set consists of ribs such as 28 which are welded internally to the tube 20 and this latter accordingly performs the function of the cold structure which was previously performed by the concrete 2. The ribs are provided with edges which are bent back to form hooks so that, by inserting the prefabricated lining membrane within the interior of the tube, the ribs 26 and 28 are thus joined together in pairs. This coupling system is endowed with rigidity by subsequent pouring of concrete. For the purpose of connecting the outer duct (top half-view) within the mass of the cylindrical shell of the pressure vessel, the steel tube 20 is caused to penetrate into said cylindrical shell over a certain length. Said tube is accordingly fitted externally with anchoring rods. This is shown in FIG. 2 in the case of a duct of smaller diameter which is suitable for use as a water inlet duct.

A further advantage lies in the fact that the corrugations of the lining membrane provide the equivalent of longitudinal stiffening ribs. This accordingly achieves a considerable reduction in the bending effects between two consecutive anchoring points in the direction of the length of the duct. It is readily apparent that the corrugated sheet-metal elements must be anchored longitudinally both at the ends and at duct bends since they are subjected to very high stress in the longitudinal direction at the time of temperature variations and can in particular reach the plastic deformation stage at each cycle. The longitudinal rigidity afforded by the corrugated membrane structure makes it possible to obtain this performance without any cumulative deformation during cycling.

What we claim is:

1. A system for sealing and heat-insulating a duct which contains a hot fluid under pressure and is limited by a cold structure surrounding the duct, wherein said system comprises:
   an internal duct lining of rigid heat-insulating material,
   a cylindrical sheet-metal element of corrugated transverse section having wave troughs within and completely covering said heat-insulating lining, said lining being provided with the same corrugations as said sheet-metal element,
   means for anchoring said sheet-metal element in the cold structure and disposed along radii of said duct, each of the means aforesaid being secured at one end thereof to one wave trough of said sheet-metal element and at the other end thereof to said cold structure.

2. A system according to claim 1, wherein the anchoring means are constituted by rods uniformly spaced along the length of the duct.

3. A system according to claim 1, wherein the anchoring means are constituted by flat bars.

4. A system according to claim 1, wherein the anchoring means are joined to the corrugated sheet-metal element by means of a plurality of continuous sheet-metal ribs disposed in radial planes and welded along the entire length of each corrugation.

5. A system according to claim 1, wherein the cold structure is of concrete.

6. A system according to claim 1, wherein the cold structure is a metal cylinder.

7. A system according to claim 1, wherein the corrugated sheet-metal element is of stainless steel.

* * * * *